(12) United States Patent
Bradley et al.

(10) Patent No.: US 9,091,829 B2
(45) Date of Patent: Jul. 28, 2015

(54) OPTICAL CONNECTION HAVING MAGNETIC COUPLING WITH A PISTON

(71) Applicant: Corning Cable Systems LLC, Hickory, NC (US)

(72) Inventors: Mark Alan Bradley, Hickory, NC (US); Micah Colen Isenhour, Lincolnton, NC (US); Dennis Michael Knecht, Hickory, NC (US); James Phillip Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 14/099,917

(22) Filed: Dec. 7, 2013

(65) Prior Publication Data

US 2014/0112623 A1   Apr. 24, 2014

Related U.S. Application Data

(63) Continuation of application No. PCT/US2013/065814, filed on Oct. 21, 2013.

(60) Provisional application No. 61/718,040, filed on Oct. 24, 2012.

(51) Int. Cl.
  *G02B 6/36* (2006.01)
  *G02B 6/42* (2006.01)
  *G02B 6/38* (2006.01)

(52) U.S. Cl.
  CPC .............. *G02B 6/4293* (2013.01); *G02B 6/38* (2013.01)

(58) Field of Classification Search
  CPC ........ G02B 6/32; G02B 6/322; G02B 6/3886; G02B 6/4204; G02B 6/4214; G02B 6/4249; G02B 6/4292; G02B 6/4293

USPC ................... 385/53, 88; 29/428, 825
  See application file for complete search history.

(56) References Cited

U.S. PATENT DOCUMENTS

| 4,844,582 A * | 7/1989 | Giannini ............... 385/57 |
| 6,085,016 A | 7/2000 | Espindola et al. ........ 385/140 |

(Continued)

FOREIGN PATENT DOCUMENTS

| JP | 2002246111 A * | 8/2002 | ........ H01R 13/639 |
| JP | 2002-311297 A | 10/2002 | ........... G02B 6/38 |

(Continued)

OTHER PUBLICATIONS

Patent Cooperation Treaty, International Search Report and Written Opinion for International Application No. PCT/US2013/065814, Mailing Date Jan. 23, 2014—10 pages.

*Primary Examiner* — Peter Radkowski

(57) ABSTRACT

Disclosed are optical connections having a coupling portion that includes a piston and a magnet along with complimentary optical connections. In one embodiment, the optical connection includes an optical interface portion having at least one optical channel and a coupling portion. The coupling portion includes a piston that is movable between a first position and a second position, a resilient member for biasing the piston to the first position and a magnet for retaining the piston at the second position. In one embodiment, the piston may be disposed in a body of the optical connection. The piston may be formed from a ferrous material and since it is not magnetic it does not attract metal trash; however, it still allows coupling (e.g., mating) of optical connections using magnetic retention. Additionally, the piston may optionally include a cover portion if desired.

22 Claims, 18 Drawing Sheets

(56) References Cited

U.S. PATENT DOCUMENTS

| | | | |
|---|---|---|---|
| 6,896,421 B2 * | 5/2005 | Monson et al. | 385/89 |
| 7,517,222 B2 | 4/2009 | Rohrbach et al. | 439/39 |
| 7,566,224 B2 | 7/2009 | Wu | 439/39 |
| 7,641,477 B2 | 1/2010 | DiFonzo et al. | 439/39 |
| 7,645,143 B2 | 1/2010 | Rohrbach et al. | 439/39 |
| 7,755,462 B2 * | 7/2010 | Fullerton et al. | 335/306 |
| 7,817,005 B2 * | 10/2010 | Fullerton et al. | 335/306 |
| 7,817,006 B2 * | 10/2010 | Fullerton et al. | 335/306 |
| 7,874,844 B1 | 1/2011 | Fitts, Jr. | 439/39 |
| 7,901,216 B2 | 3/2011 | Rohrbach et al. | 439/39 |
| 8,087,939 B2 | 1/2012 | Rohrbach et al. | 439/39 |
| 8,138,869 B1 | 3/2012 | Lauder et al. | 335/219 |
| 8,143,982 B1 | 3/2012 | Lauder et al. | 335/219 |
| 8,143,983 B1 | 3/2012 | Lauder et al. | 335/219 |
| 8,177,560 B2 | 5/2012 | Rohrbach et al. | 439/39 |
| 8,180,093 B2 | 5/2012 | Hankey et al. | 381/374 |
| 8,185,084 B2 | 5/2012 | Terlizzi | 455/343.5 |
| 8,242,868 B2 | 8/2012 | Lauder et al. | 335/219 |
| 8,315,492 B2 * | 11/2012 | Chen et al. | 385/33 |
| 2003/0117623 A1 | 6/2003 | Tokhtuev et al. | 356/338 |
| 2004/0165836 A1 * | 8/2004 | Monson et al. | 385/89 |
| 2010/0080563 A1 * | 4/2010 | DiFonzo et al. | 398/115 |
| 2010/0272403 A1 * | 10/2010 | Chen et al. | 385/93 |
| 2011/0091181 A1 * | 4/2011 | DeMeritt et al. | 385/140 |
| 2012/0082417 A1 | 4/2012 | Stanley et al. | 385/77 |
| 2012/0170886 A1 * | 7/2012 | Yu et al. | 385/14 |
| 2012/0189248 A1 * | 7/2012 | Hsu | 385/33 |

FOREIGN PATENT DOCUMENTS

| | | | | |
|---|---|---|---|---|
| JP | 2002311297 A | * | 10/2002 | G02B 6/38 |
| WO | WO 2010/036956 A1 | | 4/2010 | |

* cited by examiner

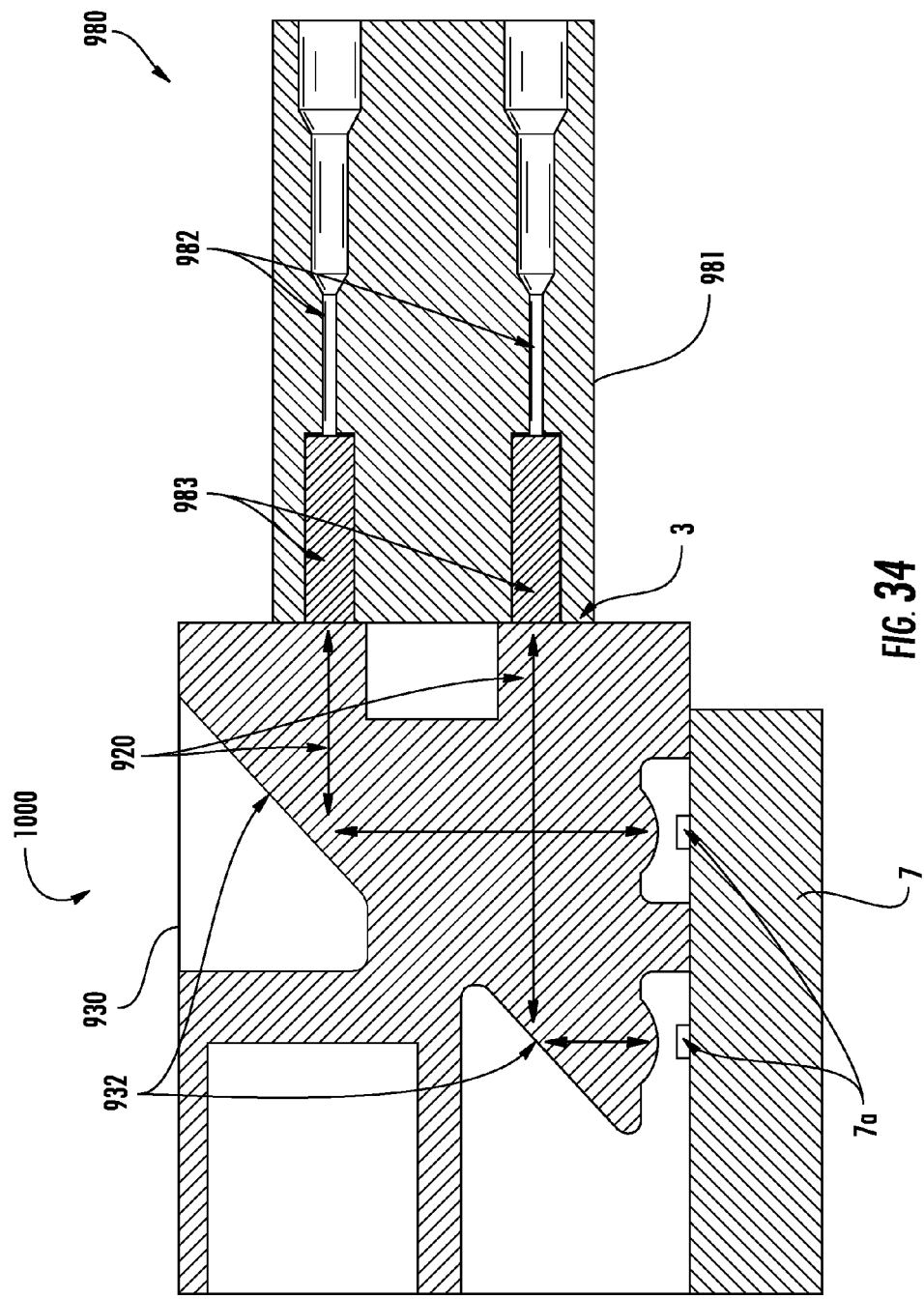

OPTICAL CONNECTION HAVING MAGNETIC COUPLING WITH A PISTON

PRIORITY

This application is a continuation of International Application No. PCT/US13/65814 filed Oct. 21, 2013, which claims the benefit of priority to U.S. Application No. 61/718,040 filed Oct. 24, 2012, both applications being incorporated herein by reference.

BACKGROUND

The disclosure is directed to optical connections for use in devices. More specifically, the disclosure is directed to optical connections having a coupling portion that includes a piston and a magnet along with complimentary optical connections.

Optical fibers have displaced copper-based connectivity in much of the traditional long-haul and metro telecommunication networks for numerous reasons such as large bandwidth capacity, dielectric characteristics and the like. As consumers require more bandwidth for consumer electronic devices such as smart phones, laptops, tablets and the like optical fibers and optical ports for optical signal transmission are being considered for replacing the conventional copper-based connectivity for these applications. However, there are significant challenges for providing optical connectivity in consumer devices compared with copper-based connectivity. By way of example, devices such as smart phones, laptops and tablets are exposed to rough handling and harsh environments and the consumer will expect optical connectivity to handle these demanding conditions. Further, these types of devices will require a large number of mating/unmating cycles during their lifetime.

Thus, there is an unresolved need for optical ports in consumer devices and other devices that can accommodate the harsh treatment and user environment along with the large number of mating/unmating cycles expected during the lifetime of the device.

SUMMARY

The disclosure is directed to optical connections having a coupling portion that includes a piston and a magnet along with complimentary optical connections. The optical connections disclosed herein may be used in a variety of arrangement such as plug, receptacles. backplanes and as portions of a module by way of example and not limitation. In one embodiment, the optical connection includes an optical interface portion having at least one optical channel and a coupling portion. The coupling portion includes a piston that is movable between a first position and a second position, a resilient member for biasing the piston to the first position and a magnet for retaining the piston at the second position. In one embodiment, the piston may be disposed in a body of the optical connection. The piston may be formed from a ferrous material and since it is not magnetic it does not attract metal trash; however, it still allows coupling (e.g., mating) of optical connections using magnetic retention. Additionally, the piston may optionally include a cover portion if desired.

The disclosure is also directed to an optical connection including an optical interface portion having at least one optical channel, where the optical interface portion is a portion of a lens block. The lens block has a total internal reflection (TIR) surface for turning the optical signal of the at least one optical channel, a first bore and a second bore, and the first bore and the second bore are disposed on opposite sides of the optical interface portion. The optical connection also includes a retainer attached to the lens block, a first coupling portion, and a second coupling portion. The first coupling portion includes a first piston that is movable between a first position and a second position, a first resilient member for biasing the piston to the first position and a first magnet for retaining the first piston at the second position, the first magnet being secured to the retainer, wherein the first position provides a first gap between the first piston and the first magnet, and the first piston being generally flush with a front surface of the optical connection in the first bore of the lens block at the first position. Likewise, the second coupling portion having a second piston that is movable between a first position and a second position, a second resilient member for biasing the second piston to the first piston position and a second magnet for retaining the piston at the second position, the second magnet being secured to the retainer, wherein the first position provides a second gap between the second piston and the second magnet and the second piston is generally flush with the front surface of the optical connection in the second bore of lens block at the first position. Additionally, the pistons may optionally include a cover portion if desired.

The disclosure is also directed to other complimentary optical connections configured for mating with optical connections including a coupling portion. In one embodiment, the complimentary optical connection includes an optical interface portion having at least one optical channel, a body having an alignment feature, and a magnet disposed within the alignment feature. The optical connections disclosed herein may have any suitable arrangements for the optical interface portions or optical channels as desired such as lenses such as molded with a body or discrete lenses, optical fibers, total internal reflection (TIR) surface and the like.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIG. 34 is a representative cross-sectional view of mated optical channels between an optical connection configured as a plug and an optical connection configured as a receptacle arranged as a multi-row palindromic optical connection.

DETAILED DESCRIPTION

Reference will now be made in detail to the embodiments of the disclosure, examples of which are illustrated in the accompanying drawings. Whenever possible, like reference numbers will be used to refer to like components or parts.

The optical connections disclosed herein enable high-speed data applications for transmitting optical signals to electronic devices. Further, the optical connections may have a relatively small and compact footprint so that they are useful for use with electronic devices such as consumer devices and the like. In one embodiment, the optical connections may be configured as an optical port of an electronic device so it can receive optical signals for conversion into electrical signals and vice versa for transmitting signals. In order to transmit/receive optical signals, the optical connection may include an optical interface portion having at least one optical channel. The optical channel may include one or more lenses for collimating or focusing the light from the transmission channel that is optically coupled to a laser such as a vertical-cavity surface-emitting laser (VCSEL) to an optical fiber in a complementary cable assembly, and from the optical fiber in the complementary cable assembly to a receive channel of the optical module that is optically coupled to an active element such as a photodiode or the like. The optical transceiver has a circuit board with a relatively short length that makes an electrical connection with the electronic device when installed. Likewise, the application discloses complimentary optical connections for mating with the optical connection such as arranged as an optical port of an electronic device. As used herein, "optical connection" is directed to a single-side of a mated optical interface. Consequently, the optical connections disclosed provide plug and play connectivity with a footprint that is advantageous for use with electronic devices having thin and compact profiles and the like.

Figure 1:
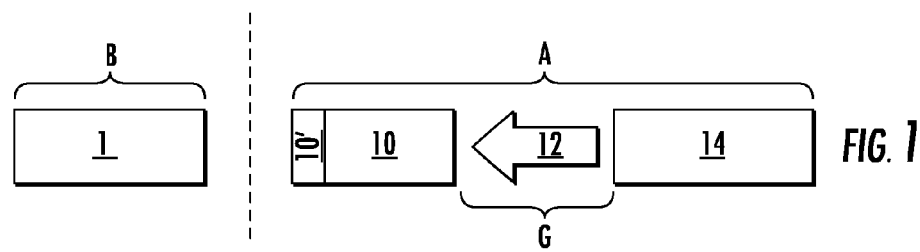
FIGS. 1-3 schematically depict the concepts of a coupling portion for an optical connection that may be used on either a plug or receptacle side of an optical connection according the concepts disclosed herein.
Figure 2:
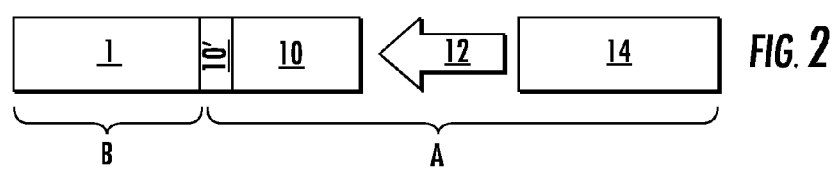
Figure 3:
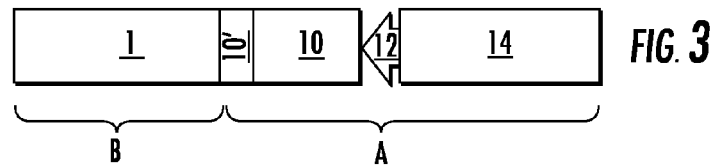

FIGS. 1-3 schematically depict the concepts of a coupling portion for an optical connection that may be used on either a receptacle-side or plug-side (e.g., being a portion of a receptacle or a plug) of an optical connection, and the concepts may be used in other applications as desired. For the purposes of explanation, FIGS. 1-3 depict the coupling portion disposed on a receptacle-side as represented by bracket A of the optical connection (which is not shown in FIGS. 1-3) along with the complimentary plug-side as represented by bracket B. Optical connection also includes an optical interface portion with at least one optical channel, which is not shown in the schematics of FIGS. 1-3. In FIG. 1 the dashed line represents the demarcation of the receptacle-side represented by bracket A and the plug-side represented by bracket B. Coupling portion represented by bracket A includes a piston 10 that is movable between a first position (FIG. 1) and a second position (FIG. 3). Moving piston 10 between the first position (FIG. 1) and a second position (FIG. 3) occur when engaged by a complementary magnet 1 disposed on the plug-side as represented by bracket B during mating of the plug and the receptacle as an example. Specifically, FIG. 2 depicts the engagement of the plug-side represented by bracket B with the receptacle-side represented by bracket A for moving piston 10 toward the second position.

The coupling portion represented by bracket A also includes a resilient member 12 for biasing the piston 10 to the first position (FIG. 1) and a magnet 14 for retaining the piston at the second position (FIG. 3) when engaged by the complimentary plug. Piston 10 may be disposed in a body of the optical connection and the body may have a bore sized for receiving the piston for allowing movement of the piston 10 between the first position (FIG. 1) and the second position (FIG. 3). As shown, the first position (FIG. 1) provides a gap between the piston 10 and the magnet 14 as represented by bracket G. In the optical connection, the piston 10 may be generally flush with a front surface of the optical connection as desired in the first position, but other relative locations such as protruding or recessed are possible for the piston 10. Further, the magnet 14 may be attached to a retainer that is attached to the body of the optical connection. A resilient member 12 such as a coil may be used for biasing the piston 10 to the first position (FIG. 1). Piston 10 may optionally include a cover portion 10' about a portion of the piston 10 that is formed from a ferrous material such as steel, iron or the like. Using a ferrous material for piston 10 is advantageous since it will not attract trash metal or other magnetic material to the piston. If used, cover portion 10' protects the piston 10 from environmental effects and may provide an aesthetic surface. Further, the cover portion 10' is considered a portion of the piston 10 if used. During mating of the plug-side with the receptacle-side, the magnet 1 of the plug-side is attracted to the ferrous material of piston 10 when brought into proximity, then the ferrous material of piston 10 becomes part of the magnetic system as the plug engages the receptacle overcoming the restoring force of resilient member 12 and in turn retaining (i.e., securing or mating) the plug to the receptacle as shown in FIG. 3. Additionally, magnet 1 of the plug-side may be disposed within a portion of an alignment feature for protecting the same and/or allowing easy cleaning of any debris that may be collected. Likewise, the concept of having the magnet disposed within a portion of the alignment feature may be used on any suitable optical connection such as plug, receptacle, backplane, optical port, as part of a module, etc.

Figure 4:
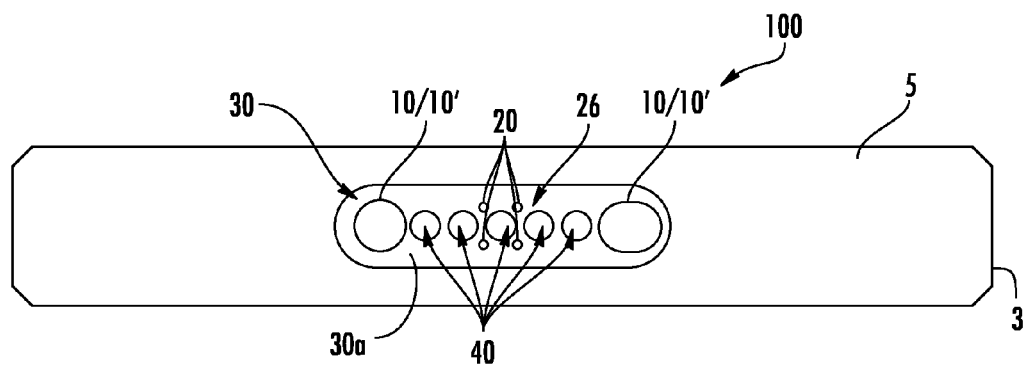
FIG. 4 is a front view of an optical connection of a receptacle using the coupling portion concepts disclosed herein.

FIG. 4 is a front view of an optical connection 100 configured as a receptacle that is a portion of an electronic device 3 using the coupling concepts disclosed herein. As shown, the electronic device 3 includes a faceplate 5 with an opening for mounting the optical connection 100, but the optical connection may be used with other suitable devices. The optical connection 100 includes an optical interface portion 26 having at least one optical channel 20. Optical channels 20 may include any suitable components or structure as desired. In this embodiment, the optical interface portion 26 has four optical channels 20 that each include a gradient index (GRIN) lens, but in other embodiments the optical channels could include lenses that are integrally molded with a portion of the receptacle such as the body 30 (e.g., thereby forming a lens block) or optical fibers at the mating interface. The coupling portion includes a piston 10 (not visible) having optional cover portion 10' that is visible at a front surface 30a of the optical connection 100. The optical connection 100 further includes a body 30 and piston 10 is disposed in the body 30 of the optical connection 100. Body 30 has a bore sized to receive piston 10 and allow movement of the piston 10.

In this embodiment, the optical connection 100 includes a first coupling portion and a second coupling portion. The second coupling portion includes a second piston 10 that is movable between the first position and the second position, a second resilient member 12 for biasing the second piston to the first position and a second magnet 14 for retaining the second piston at the second position. As shown, the first coupling portion and the second coupling portion are disposed on opposite sides of the optical interface portion 26. Likewise, body 30 has two bores disposed on opposite sides of the optical interface portion 26. The bores of body 30 each respectively receive one of the pistons 10 of the coupling portions. As depicted, the two cover portions 10' have different shapes; specifically, the left piston has a round shape (e.g., hole) and the right piston has an oval shape (e.g., slot), but there are other suitable geometrical arrangements for the pistons/cover portions of the coupling portion that provide mating with a complimentary device. For instance, the cover portions 10' may have the same shape if desired.

When piston 10 is in the first position (e.g., not mated and the piston is biased forward) it has a gap G between the piston and the magnet and the piston 10 is generally flush with the front surface 30a of the optical connection 100. Since pistons 10 are generally flush with front surface 30a when in the first position they inhibit dirt and debris from entering and/or filling the bores of body 30. For instance, the front surface 30a is formed by body 30 in this configuration. Piston 10 is biased forward by a resilient member (not visible) such as a coil spring. If desired, piston 10 includes a ferrous material and can include a cover portion 10'. If piston 10 includes a cover portion 10' it is disposed about a front portion of the ferrous material.

Optical connection 100 further includes one or more electrical connections 40. In this embodiment, optical connection 100 has five (5) electrical connections 40 symmetrically arranged about the center of the optical connection 100. Electrical connections 40 are configured as electrical pads for making electrical contact with complimentary electrical connections on a plug such as pogo pins. As shown, the optical channels 20 are arranged symmetrically about the center electrical connection 40 but other suitable arrangements are possible. Consequently, the optical connection 100 has a palindromic layout so the complementary plug may be mated with the optical connection 100 in either orientation and still provides optical and electrical connectivity. The electrical connections 40 may be used for transmitting power and/or communication signals.

Figure 5:
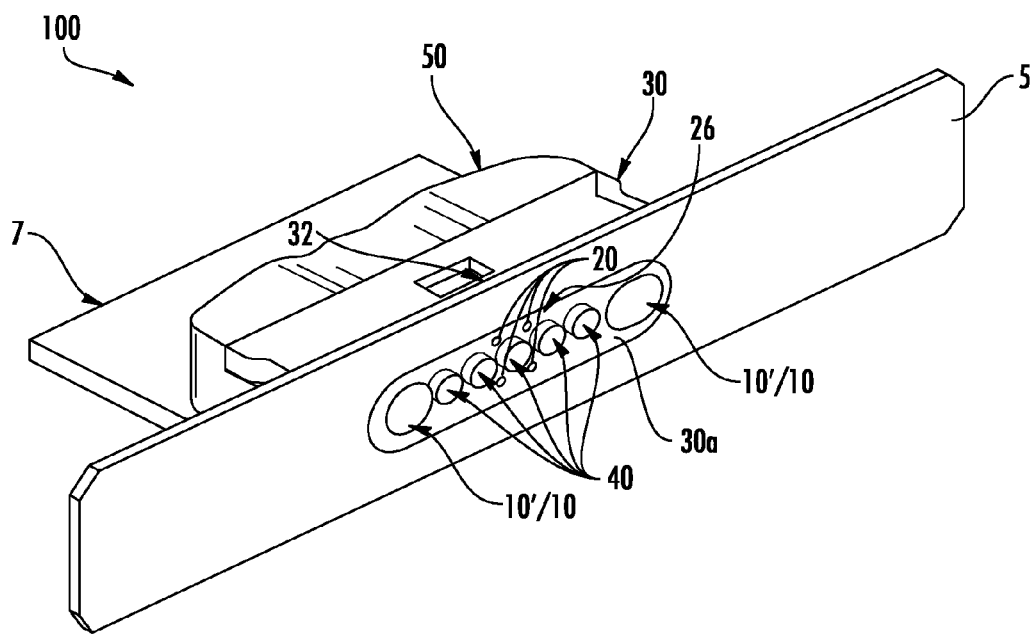
FIG. 5 is a perspective view of an assembled receptacle similar to the receptacle of FIG. 4 according to the concepts disclosed herein.
Figure 6:
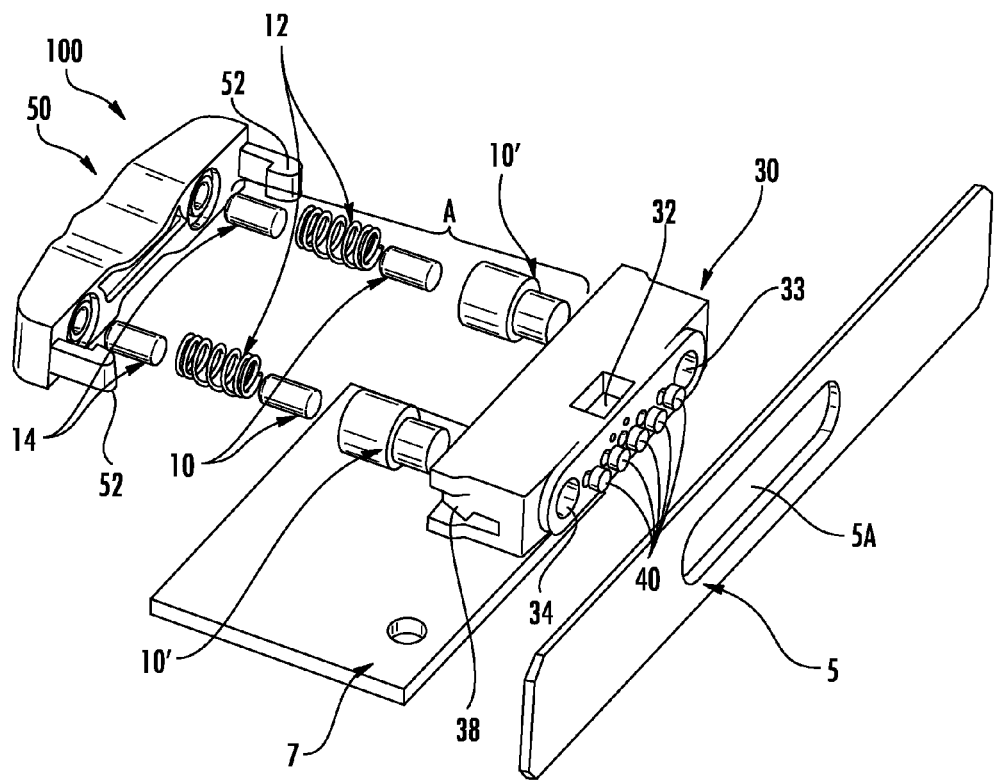
FIG. 6 is a partially exploded view of the receptacle of FIG. 5.

FIG. 5 is a perspective view of an assembled receptacle having optical connection 100 that is similar to the receptacle of FIG. 4; and FIG. 6 is a partially exploded view of the receptacle of FIG. 5 showing the coupling portion represented by bracket A. Optical connection 100 includes optical interface portion 26 having at least one optical channel 20. In this embodiment, the optical interface portion 26 includes four optical channels 20 that each includes a lens that is integrally molded as portion of body 30. Consequently, the optical interface portion 26 includes body 30 as a portion of a lens block since the lens are integrally molded as a portion of body 30 (i.e., the body 30 is a lens block in this embodiment). The arrangement of the optical interface portion 26 about the center electrical connection 40 is similar to the optical connection 100 of FIG. 4. Likewise, the arrangement of electrical connections 40 is similar to the optical connection 100 of FIG. 4.

As shown, a portion of body 30 is exposed at an opening 5A of faceplate 5 that is a portion of an electronic device when assembled. Body 30 is configured as a portion of a lens block in this embodiment since it also includes a total internal reflection (TIR) surface 32 for turning optical signal of at least one optical channel 20. More specifically, this embodiment of optical connection 100 is a portion of a receptacle with the optical interface portion 26 being a portion of a lens block 30 (e.g., body) having a TIR surface 32 for turning the optical signal of the at least one optical channel 20 with the optical connection 100 being in optical communication with one or more active components (not visible) attached to a circuit board 7. When body 30 is configured as a lens block such as having lens integrally molded into the body 30, then the body 30 (e.g., lens block) needs to be formed from a material that is suitable for the transmission of optical signals at the desired wavelengths. By way of example, a suitable material for body 30 (e.g., lens block) of this embodiment is ULTEM, but other suitable materials are possible. Further, the active components on circuit board 7 are used for the receiving optical signals and for transmitting optical signals from body 30 (e.g., lens block) depending on the particular active component. By way of example, circuit board 7 includes active components such as laser-diodes or vertical-cavity surface-emitting lasers (VCSEL) for the transmit channels and photodiodes for the receive channels.

Optical connection 100 also includes a retainer 50 for securing the coupling portion represented by bracket A so that the piston 10 is disposed in the body 30 of the optical connection 100. In this embodiment, the coupling portion includes piston 10 that is movable between a first position and a second position, a resilient member 12 for biasing the piston to the first position and a magnet 14 for retaining the piston at a second position. Magnet 14 is secured to the retainer 50 in any suitable fashion so it is anchored and may retain the piston 10 in the second position. For instance, magnet 14 may be secured using an adhesive or have a mechanical attachment.

More specifically, optical connection 100 includes a first coupling portion and a second coupling portion where the first and second coupling portions are disposed on opposite sides of the optical interface portion 26. To accommodate the first and second coupling portions, body 30 has a first bore 33 and a second bore 34 for respectively receiving the first and second coupling portions. The first and second bores 33,34 are respectively sized for receiving the desired piston 10 and allow movement of the piston in the respective bore. In this embodiment, the pistons 10 having the cover portions 10' are disposed in the respective first and second bores 33,34 of body 30 so they are generally flush with the front surface 30*a* of optical connection 100. As depicted, cover portions 10' have a stepped profile that acts as a stop and inhibits over-travel beyond a desired position such as a generally flush position with the front surface 30*a*. Likewise, the first and second bores 33,34 of body 30 are shaped accordingly with a stepped bore to cooperate with the stepped profile of the cover portions 10'. The ferrous material of pistons 10 are then secured to cover portions 10' and then inserted into the first and second bores 33,34 of body 30 followed by respective resilient members 12 and followed by securing retainer 50 to body 30. Retainer 50 includes arms 52 having attachment features (not numbered) such as latches that snap-fit to complimentary attachment features 38 of body 30 for disposing (e.g., retaining) the pistons 10 in the body 30. Once optical connection 100 is assembled it can be aligned to the circuit board 7 so that the optical channels 20 are aligned with active components mounted on circuit board 7.

Figure 7:
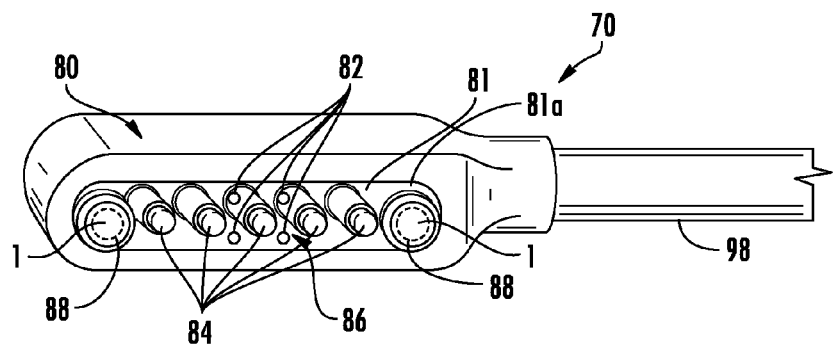
FIG. 7 is a perspective view of a cable assembly having a complimentary plug that cooperates with the receptacle of FIGS. 5 and 6.

FIG. 7 is a perspective view of a cable assembly 70 having a complimentary optical connection 80 configured as a plug attached to cable 98 that cooperates with the optical connection 100 configured as the receptacle of FIGS. 5 and 6. When optical connection 80 and optical connection 100 are mated they enable optical and electrical connections. Although shown configured as a plug, the concepts of optical connection 80 may be used on either a receptacle-side or plug-side (e.g., being a portion of a receptacle or a plug) of an optical connection. For instance, optical connection 80 may be a portion of an electronic device if desired; instead of being a portion of a plug. Optical connection 80 includes an optical interface portion 86 having at least one optical channel 82 along with a body 81 having an alignment feature 88 along with magnet 1 disposed within the alignment feature 88.

Alignment feature 88 of optical connection 80 protrudes from a front surface 81*a* of body 81 for pressing piston 10 of optical connection 100 toward the second position when being mated together. In other words, the alignment feature 88 contacts the piston 10 or cover portion 10' of optical connection 100 during mating and presses it into the respective bore of body 30 so the piston/cover portion moves from the first position to the second position. As shown, body 81 includes two alignment features 88 arranged as round protrusions disposed on opposite sides of the optical interface portion 86 that have a similar spacing as between the pistons 10 of optical connection 100. Each alignment feature 88 includes a respective magnet 1 disposed within the material of the respective alignment feature 88. By way of example, the body 81 may be molded about the magnets 1 to cover or seal the magnets 1 in the body 81. In other embodiments, magnet 1 could be exposed; however, an exposed magnet 1 may make it more difficult to clean metallic trash that is attracted to the magnet 1.

Like optical connection 100, optical connection 80 includes the optical interface portion 86 with four optical channels 82 that are arranged with a similar spacing about the center electrical connection 40 so respective optical channels are aligned. Optical channels 82 may include any suitable components or structure as desired. In this embodiment, the optical interface portion 86 has four optical channels 82 that each include a GRIN lens, but in other embodiments the optical channels 82 could include lenses that are integrally molded with a portion of the plug such as the body 81 (e.g., thereby forming a lens block) or have optical fibers at the mating interface. If one or more lenses are integrally molded to create a lens block from the body or optical interface portion, then a suitable material is used so the lens block can transmit the optical signals. Moreover, if the optical interface portion is a portion of a lens block it may further include a TIR surface for turning the optical signal of the at least one optical channel. In the arrangement depicted, optical connection 80 uses one or more GRIN lens while optical connection 100 uses one or more lens integrally molded into the body 30, but the arrangement could be flipped. In still other embodiments, both optical connection 80 and optical connection 100 may have GRIN lenses or lens that are integrally molded in a body.

Likewise, the arrangement of the one or more electrical connections 84 of optical connection 80 is similar to the electrical connections 40 of optical connection 100 of FIGS. 5 and 6. Specifically, optical connection 80 has five (5) electrical connections 84 symmetrically arranged about the center of the optical connection 100. Electrical connections 84 are configured as pogo pins that "float" in the body 81 for making electrical contact with complimentary electrical connections 40 on optical connection 100 that are configured as electrical pads; however, other types of electrical connections are possible for either optical connection. If electrical connections were not desired, then the optical connections 80,100 could be smaller.

Figure 8:
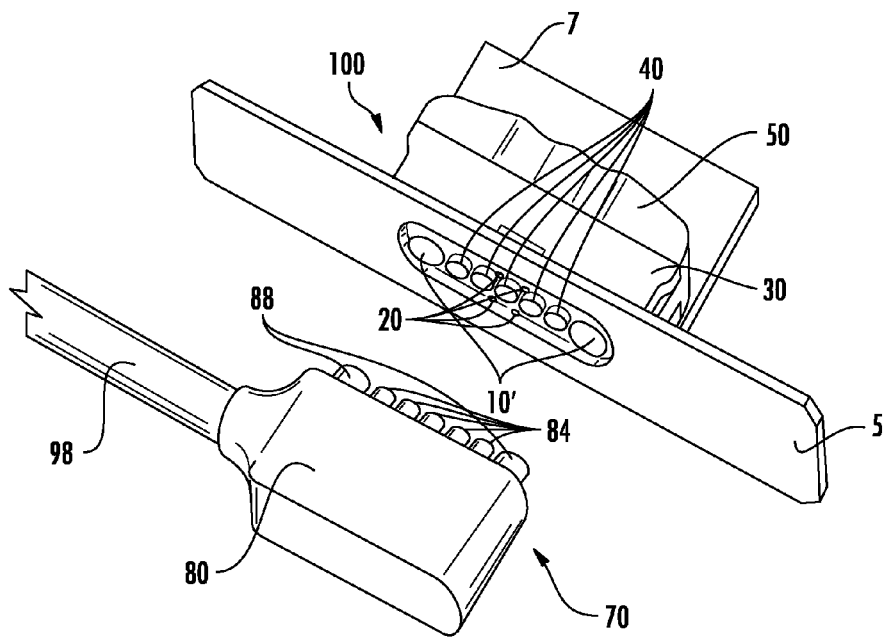
FIGS. 8 and 9 respectively are a perspective view and a partial sectional view of the plug of FIG. 7 in an unmated condition and being aligned with the optical connection of the receptacle of FIGS. 5 and 6 for mating.
Figure 9:
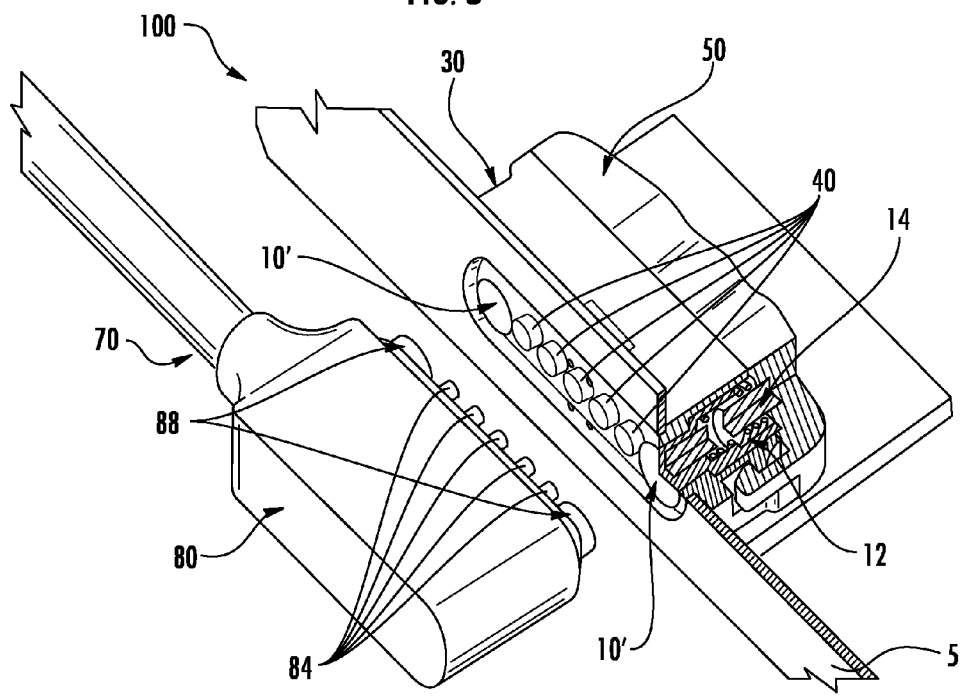
Figure 10:
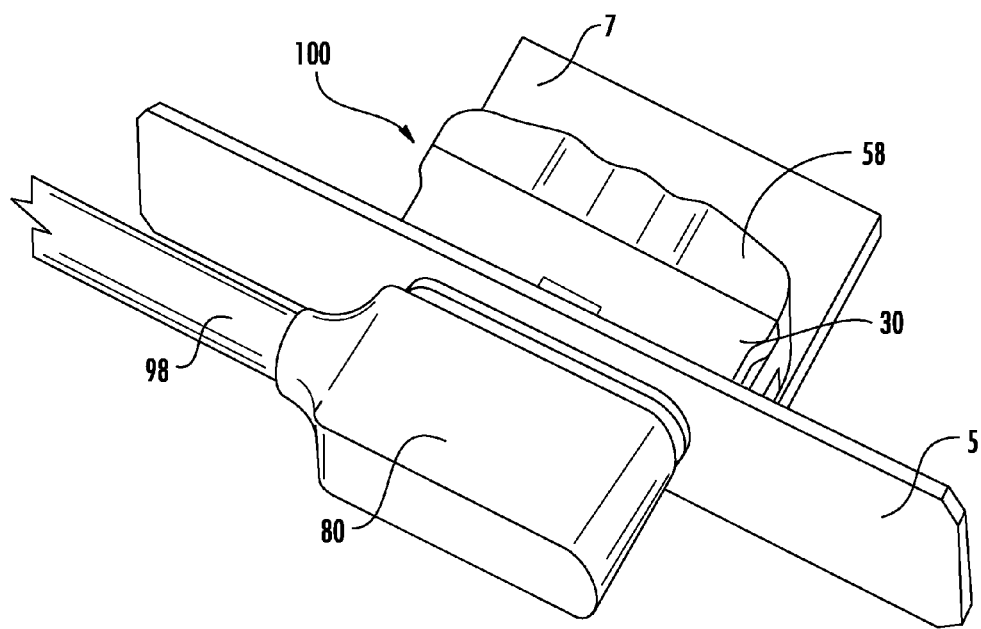
FIGS. 10 and 11 respectively are a perspective view and a partial sectional view of the plug and optical connection of receptacle of FIGS. 8 and 9 in a mated condition.
Figure 11:
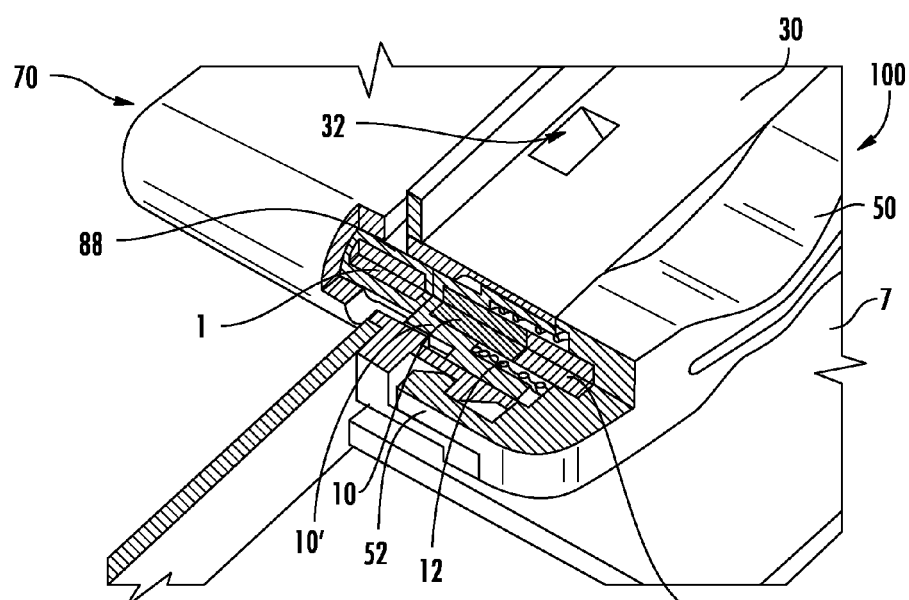

FIGS. 8-11 depict the alignment and mating of plug 80 of cable assembly 70 with the optical connection 100 of the receptacle. FIGS. 8 and 9 respectively are a perspective view and a partial sectional view of the plug 80 in an unmated condition and being aligned with the optical connection 100 of the receptacle of FIGS. 5 and 6 for mating. As shown, the alignment features 88 of optical connection 80 have a similar spacing as the pistons 10 on optical connection 100 so they can push the pistons 10 from the first position to the second position within the respective bores 33,34 of body 30 during mating. As shown, each respective resilient member 12 biases the respective piston 10/cover portions 10' forward when unmated inhibiting dirt and debris from collecting in the bores 33,34 of body 30 and effectively ejecting any dirt or debris on each unmating cycle. Moreover, since the pistons 10/cover portions 10' are generally flush with the front surface they can easily be wiped off if desired. FIGS. 10 and 11 respectively are a perspective view and a partial sectional view of the plug 80 and optical connection 100 of the receptacle of FIGS. 8 and 9 in a mated condition for enabling optical and electrical connectivity therebetween. As depicted, the coupling portion has piston 10/cover portion 10' in the second position where piston is attracted (e.g., attached) to magnet 14 for retaining optical connection 80.

Figure 12:
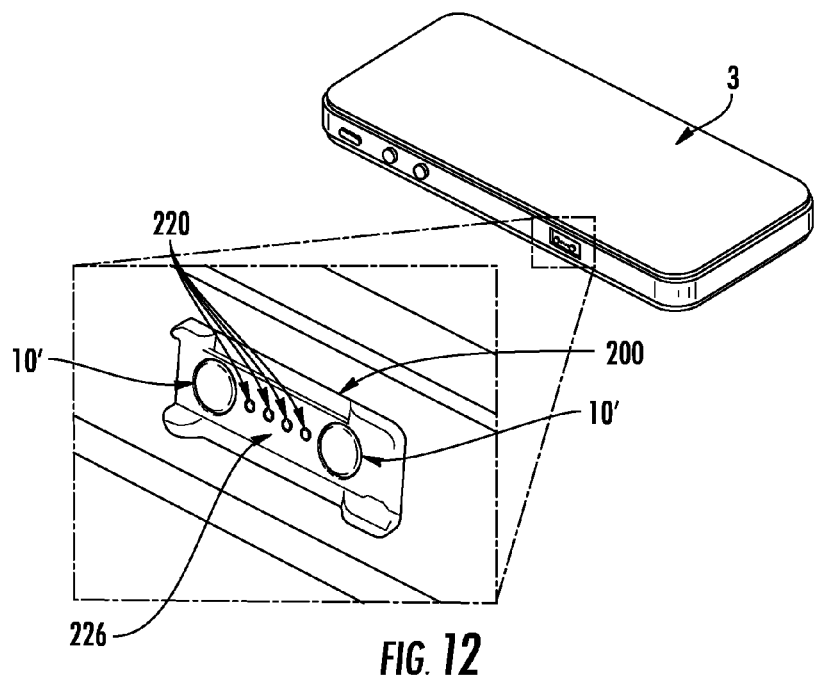
FIGS. 12 and 13 are perspective views of other variations of optical connections having coupling portions and configured as receptacles using different types of lenses for optical communications.
Figure 13:
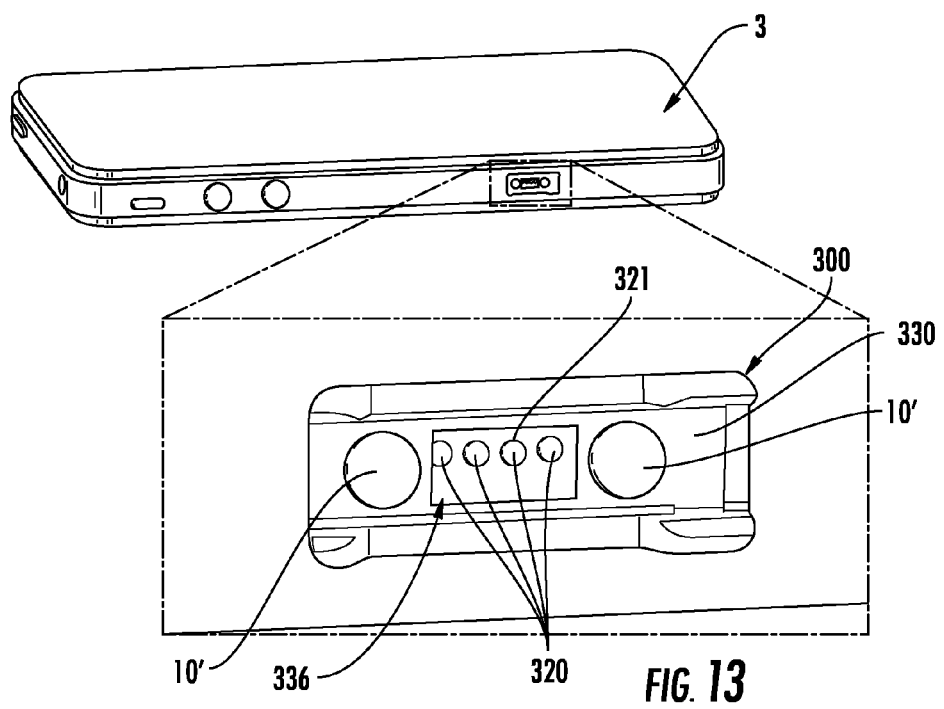

FIGS. 12 and 13 respectively are perspective views of other variations of optical connections 200,300 having coupling portions and configured as receptacles using different types of lenses for optical communications. Optical connections 200,300 have optical connections and do not include electrical connections. FIGS. 12 and 13 show optical connections 200,300 configured as a receptacle that is a portion of an electronic device 3 using the coupling concepts disclosed herein, which will not be described in detail for the sake of brevity. As shown, the electronic device 3 includes a sidewall with an opening for mounting the optical connections 200, 300, but the optical connection may be used with other suitable devices. The optical connection 200 includes an optical interface portion 226 having at least one optical channel 220. In this embodiment, the optical interface portion 226 has four optical channels 220 that each includes a gradient index (GRIN) lens. Optical connection 200 is a linear palindromic arrangement with the optical interface portion 226 having two common optical channels at the center channels (e.g. either both transmit or both receive) and two of the opposite common channels at the outboard channels (e.g. either both receive or both transmit). This arrangement of common optical channels keep transmit channels aligned with receive channels and vice versa for proper optical communication. The coupling portion of optical connections 200, 300 respectively include a piston 10 (not visible) having optional cover portion 10' that is visible at a front surface of optical connections 200, 300.

FIG. 13 depicts optical connection 300 that includes an optical interface portion 326 having at least one optical channel 320. In this embodiment, the optical interface portion 326 has four optical channels 320 that each include a lens that is integrally molded as portion of a body 330. Like the body of FIG. 5, body 330 is configured as a portion of a lens block in this embodiment since it also includes a total internal reflection (TIR) surface (not visible) for turning optical signal of at least one optical channel 320 toward active components disposed on a circuit board. Further, the body 330 (e.g., lens block in this embodiment) may include lenses at both sides of the TIR surface (e.g., additional lenses that cooperate with the active components). In this embodiment, the optical interface portion is also configured as a covered refractive. In other words, optical connection 300 includes a cover 321 at the front surface for protecting the lens of optical interface portion 326. Cover 321 may include one or more suitable coatings such as anti-reflection or anti-scratch as desired and is formed from any suitable material that allows transmission of optical signals such as glass or polymers. By providing cover 321, the lenses that are integrally molded with the body are protected from environmental effects and allows cleaning of the surface without touching the lenses. Like optical connection 200, optical connection 300 is a linear palindromic arrangement with the optical interface portion 326 having two common optical channels at the center channels (e.g. either both transmit or both receive) and two of the opposite common channels at the outboard channels (e.g. either both receive or both transmit). This arrangement of common optical channels keep transmit channels aligned with receive channels and vice versa for proper optical communication.

Figure 14:
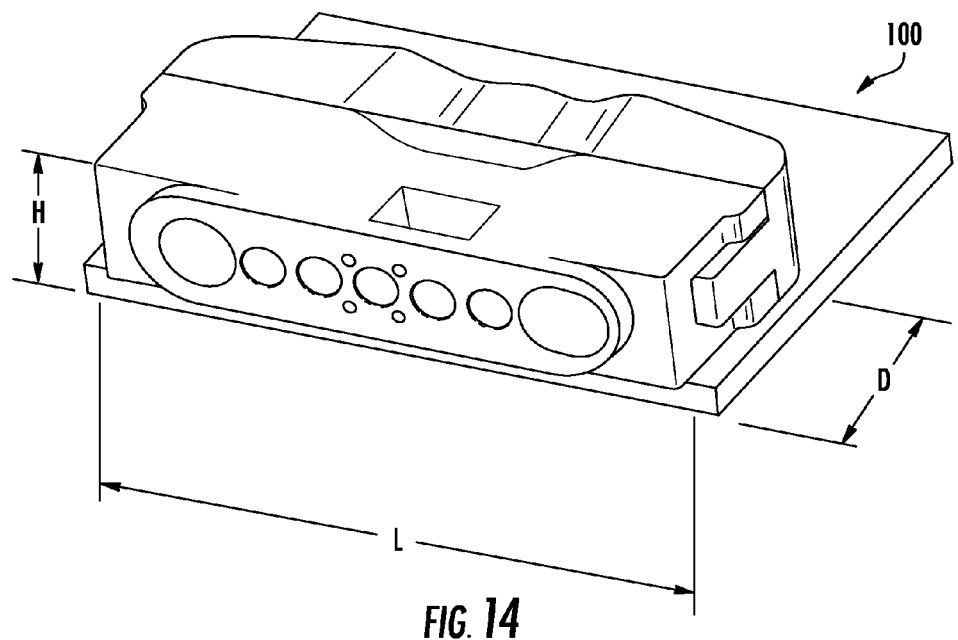
FIG. 14 depicts example dimensions for optical connections configured as a receptacle as disclosed herein.

FIG. 14 depicts example dimensions for optical connections configured as a receptacle as disclosed herein. Dimensions for optical connections 100 arranged as a receptacle for electronic devices may be influenced by the mounting requirements available in the device. Examples of dimensions for optical connections having both optical and electrical connectivity are given as: a length L may be about 21 millimeters (mm) or less, a height may be about 5 mm or less, and a depth may be about 10 mm or less; however, other suitable dimensions are possible.

Figure 15:
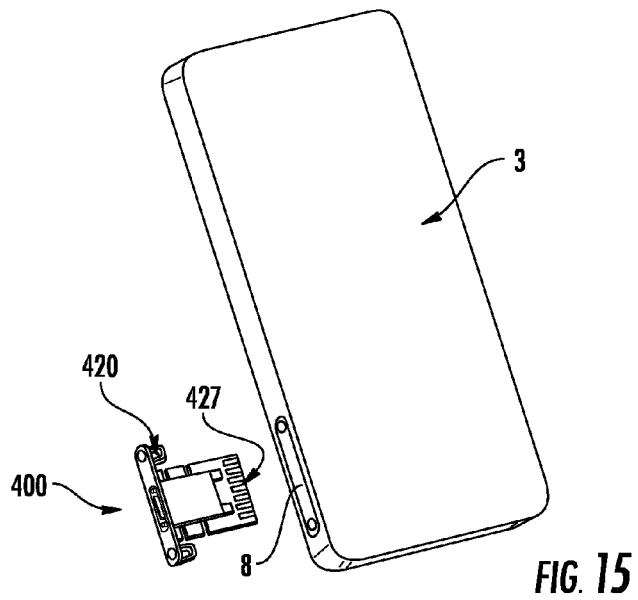
FIG. 15 depicts another variation of an optical connection configured as a receptacle that is portion of a module that may be inserted and electrically connected to a port of an electronic device.

FIG. 15 depicts another variation of an optical connection 400 configured as a receptacle such as disclosed herein that is a portion of a module that may be inserted and electrically connected to a port 8 of an electronic device 3. The module has the receptacle optical attached to a circuit board 427 like the other receptacles; however, circuit board 427 has electrical contacts at a rear surface for attaching and electrically connecting inside electronic device 3. Additionally, the module may include a faceplate 420 having one or more securing features for attaching the module to the electronic device 3 at port 8.

Figure 16:
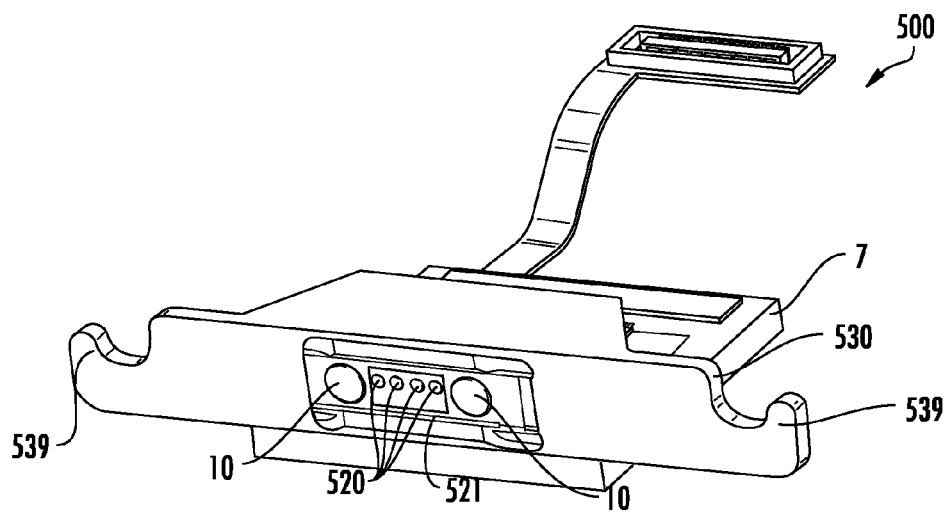
FIGS. 16-18 are views of another optical connection configured as a receptacle that is a portion of a module that includes a tethered electrical connection.
Figure 17:
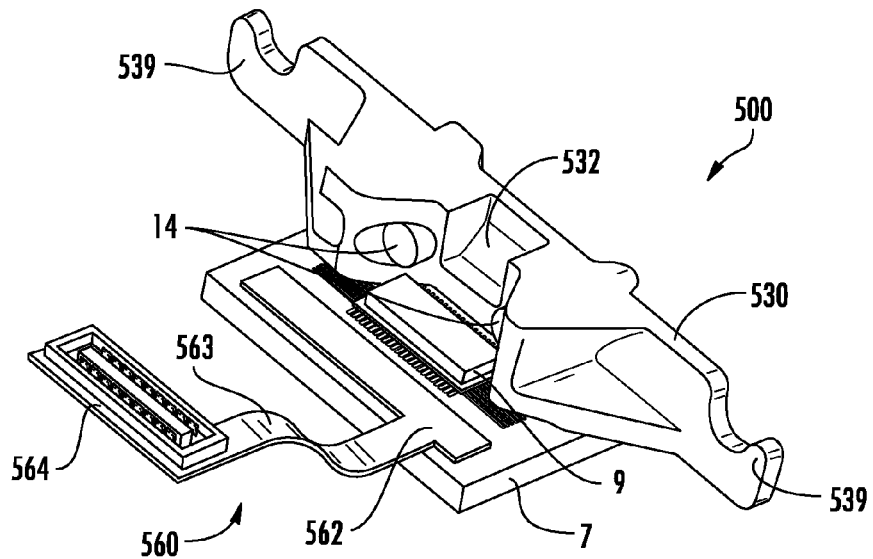
Figure 18:
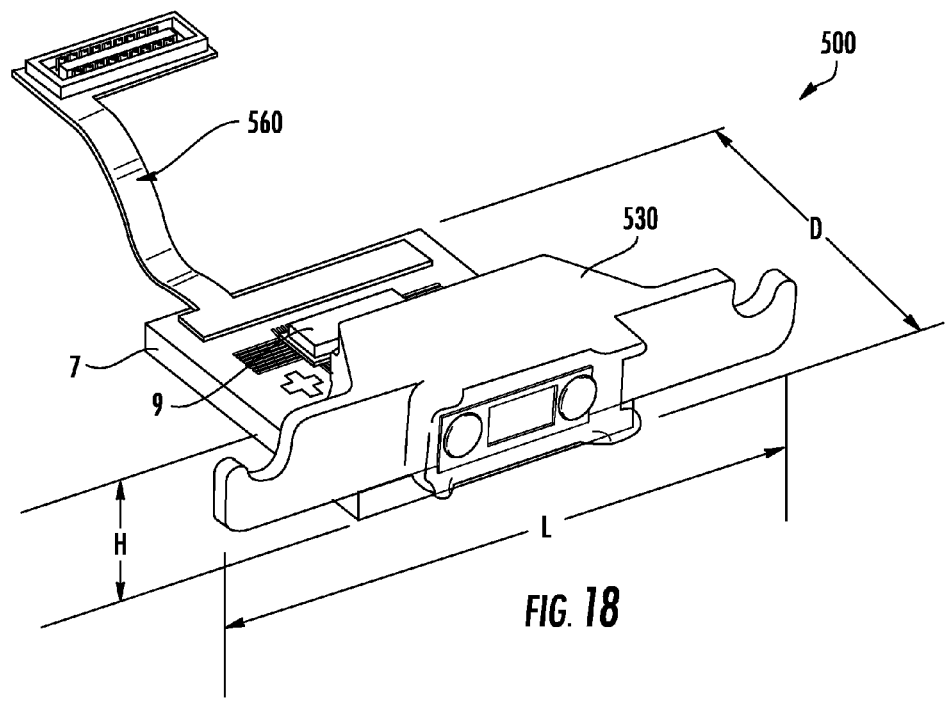
Figure 19:
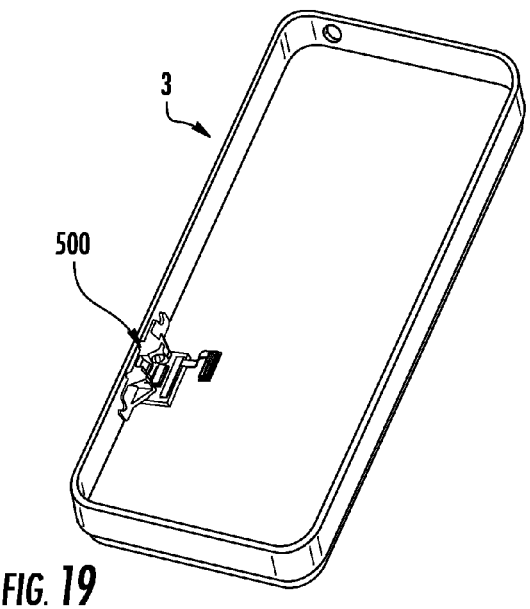
FIG. 19 depicts the optical connection of FIGS. 16-18 attached to an electronic device with the cover of the device removed for clarity.
Figure 20:
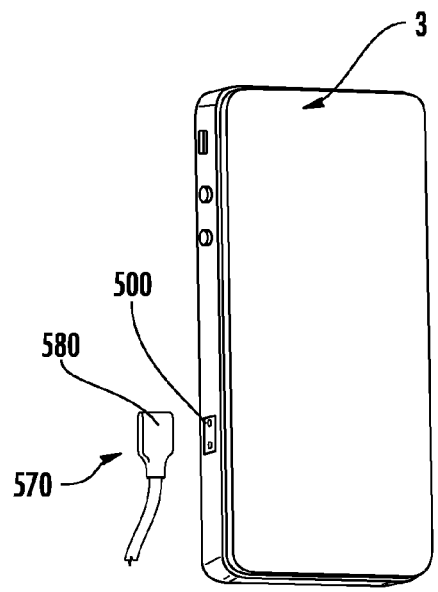
FIG. 20 depicts a plug of a cable assembly being aligned for mating with the electronic device of FIG. 19.

FIGS. 16-18 are views of another optical connection 500 configured as a receptacle such as disclosed herein that is a portion of a module that includes a tethered electrical connection 560. Optical connection 500 is similar to optical connection 300 since it is a configured as a covered refractive receptacle, but further includes tethered electrical connection 560 is used for making the electrical connection with the electronic device. By way of example, the tethered electrical connection 560 may connect a signal conditioning integrated circuit (IC) 9 to another circuit board or device. As shown, one or more electrical leads 562 extend from circuit board 7 and are terminated in an electrical connector 564. Using a tethered electrical connection 560 allows flexibility for attaching the optical connection 500 to different devices or making the device optional for the electrical device. Tethered electrical connection 560 may include any suitable electrical attachment 562 at circuit board 7 such as solder leads or a separate electrical connector as desired. Additionally, body 530 (which is configured as a lens block having TIR surface 532) may have one or more securing features 539 for securing the optical connection; however, the securing features 539 may be independent from the body 530 if desired. Examples of dimensions for optical connection 500 are given as: the length L being about 25 millimeters (mm) or less, the height being about 5 mm or less, and the depth may be about 12 mm or less; however, other suitable dimensions are possible. FIG. 19 depicts the optical connection 500 attached to an electronic device 3 with the cover of the device removed for clarity additionally the other internal components of the electronic device are removed also. FIG. 20 depicts a cable assembly 570 having a plug 580 that is similar to the structure of plug 80 with the magnet disposed within the alignment feature, but that includes an optical connection similar to optical connection 500. As shown in FIG. 20, the plug 580 of cable assembly 570 is being aligned for mating with the electronic device 3 of FIG. 19.

Figure 21:
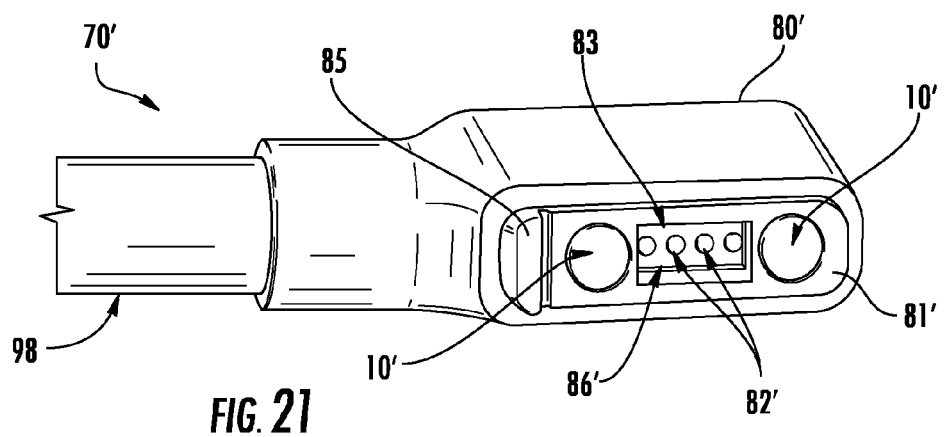
FIG. 21 is a perspective front view of an optical connection with a coupling portion configured as a plug of a cable assembly.

The concepts of the coupling portion as represented by bracket A (FIGS. 1-3) may be used on an optical connection configured as the plug and the optical connection with the magnet disposed within the alignment feature as represented by bracket B (FIGS. 1-3) may be disposed on the receptacle if desired. By way of example, FIG. 21 is a perspective front view of an optical connection 80' configured as a plug of cable assembly 70'. Optical connection 80' uses the coupling concepts having the piston 10/cover potion 10' as disclosed herein such as described with respect to FIGS. 1-3 as represented by bracket A, and will not be described again in detail for the sake of brevity. Optical connection 80' is similar to optical connection 300 since it is a configured as a covered refractive receptacle having an optical interface portion. Specifically, optical connection 80' includes an optical interface portion 86' having at least one optical channel 82'. In this embodiment, the optical interface portion 86' has four optical channels 82' that each include a lens that is integrally molded as portion of a body 81'. Like the body of FIG. 5, body 81' is configured as a portion of a lens block and may also include a total internal reflection (TIR) surface (not visible) for turning optical signal of at least one optical channel 320 toward optical fibers of cable 98. In this embodiment, the optical interface portion 86' is also configured as a covered refractive. In other words, optical connection 80' includes a cover 83 at the front surface for protecting the lens of optical interface portion 82'. As with other covers, cover 83 may include one or more suitable coatings such as anti-reflection or anti-scratch as desired and is formed from any suitable material that allows transmission of optical signals such as glass or polymers. Other variations of optical connection 80' may have an optical interface portion 86' with optical channels 82' that include GRIN lens or integrally molded lenses without the cover.

Figure 22:
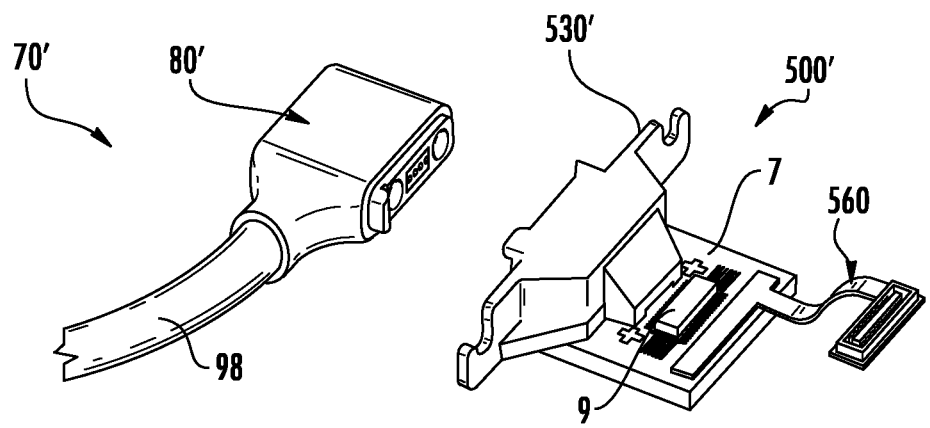
FIG. 22 is a perspective view depicting the optical connection of FIG. 21 being aligned with a complimentary optical connection configured as receptacle before being mated and FIG. 23 shows the optical connections in a mated state.
Figure 23:
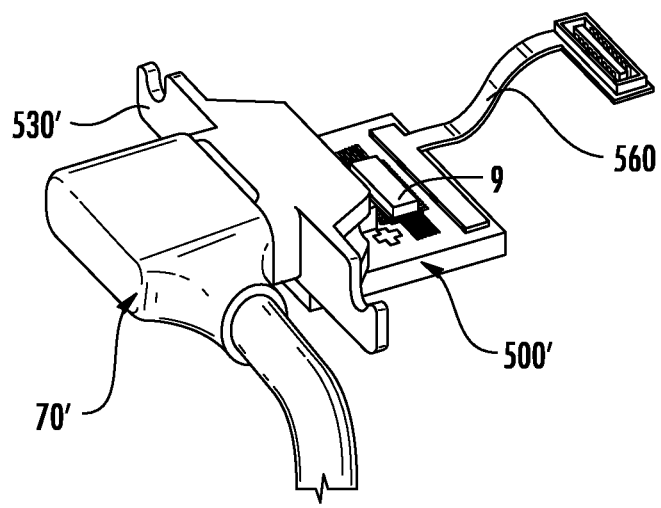

FIG. 22 is a perspective view depicting the optical connection 80' being aligned with a complimentary optical connection 500' configured as receptacle before being mated and FIG. 23 shows the optical connections 80',500' in a mated state. Optical connection 500 is similar to optical connection 80 since it has magnet 1 disposed within the alignment feature as represented by bracket B (FIGS. 1-3). Optical connection 500 includes an optical interface portion having at least one optical channel along with a body 530' having an alignment feature along with magnet 1 disposed within the alignment feature. The alignment features of optical connection 500 protrudes from a front surface of body 530' for pressing the pistons 10 of optical connection 80' toward the second position when being mated together. Each alignment feature includes a respective magnet 1 disposed within the material of the respective alignment feature. As previously discussed with respect to optical connection 80, the body 530' may be molded about the magnets 1 to cover or seal the magnets 1 in the body 530'. Other variations of optical connection 500' may have an optical interface portions with optical channels that include GRIN lens or integrally molded lenses without the cover. The assembly having optical connection 500' may further include tethered electrical connection 560 for making the electrical connection with the electronic device as discussed herein.

Figure 24:
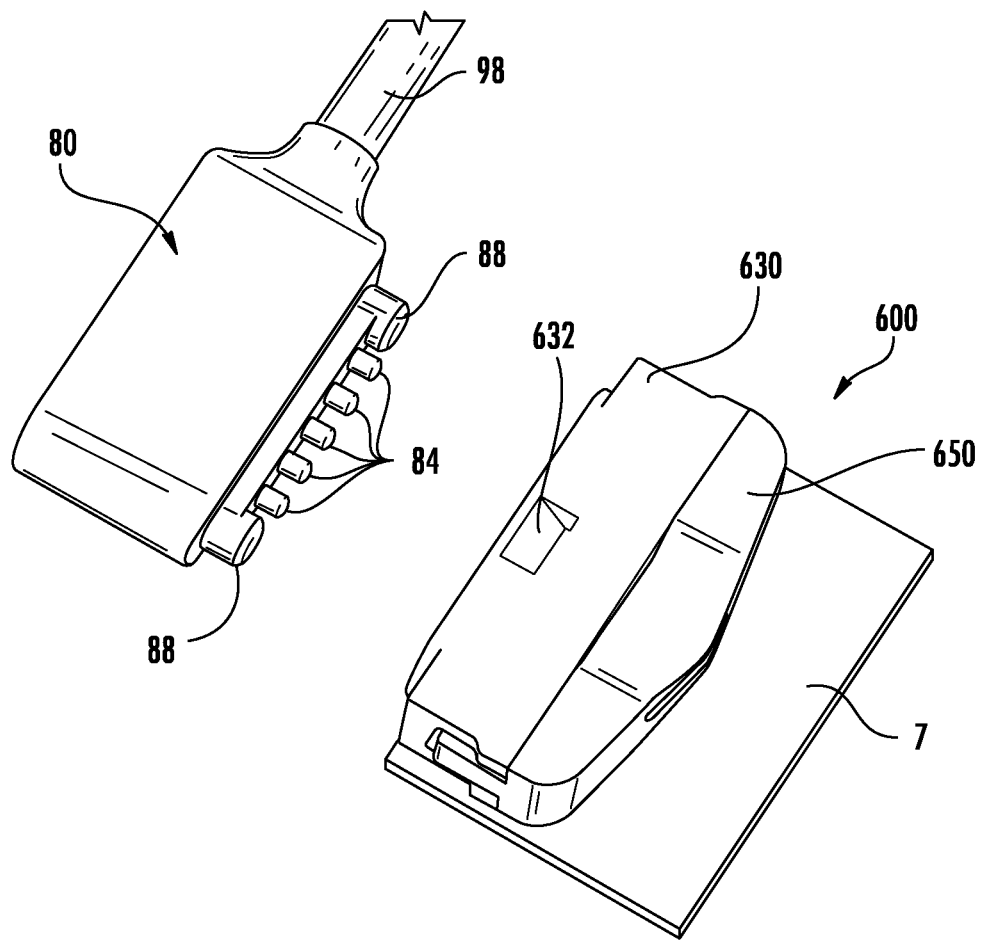
FIGS. 24-27 are perspective views of another optical connection configured as a receptacle that does not use a lens along with the complimentary optical connection configured as a plug according to the concepts disclosed
Figure 25:
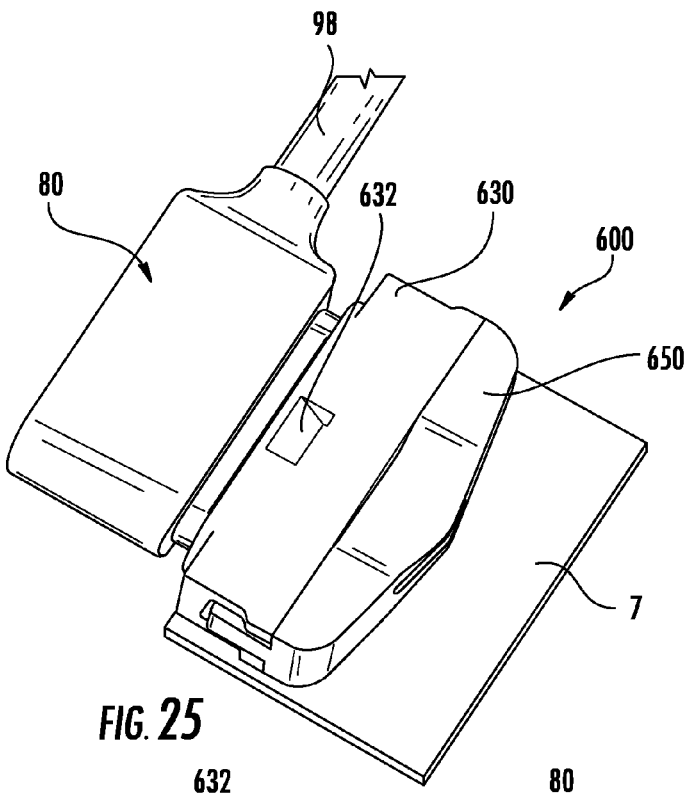
Figure 26:
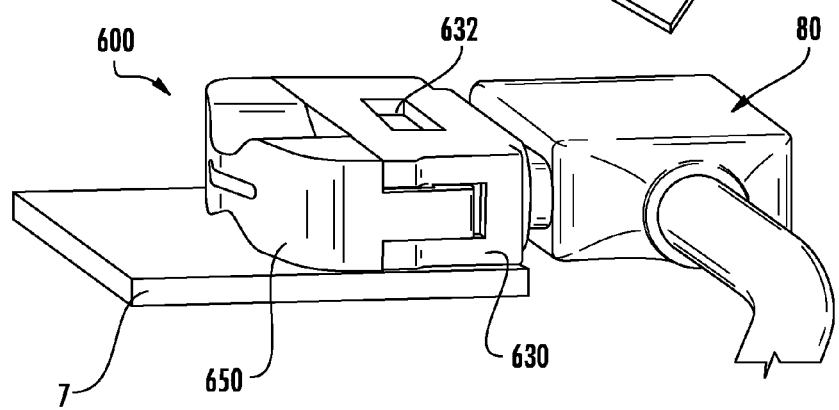
Figure 27:
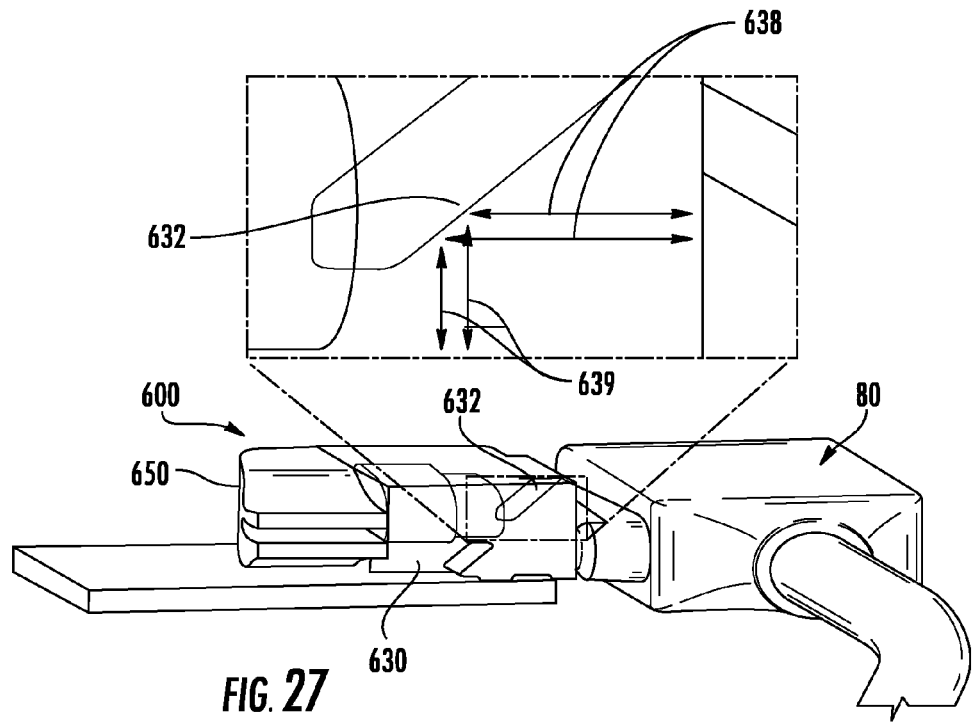

FIGS. 24-27 are perspective views of another optical connection 600 configured as a receptacle that does not use a lens along with the complimentary optical connection 80 configured as a plug. FIG. 24 depicts optical connection 600 and optical connection 80 in an unmated state and FIGS. 25 and 26 show the optical connections 600,80 in a mated state. Optical connection 600 is similar to optical connection 100 and includes the coupling portions as disclosed herein along with a body 630 and a retainer 650, but unlike optical connection 100 the body 630 of optical connection 600 does not use a lens at the optical interface portion or at other locations. Optical connection 600 includes optical interface portion having four optical channel configured for mating with optical connection 80 like optical connection 100. However, body 630 still receives and transmits optical signals therethrough and includes a TIR surface 632 for turning optical signals to and from active components disposed on circuit board 7. Consequently, body 630 is formed from a suitable material such as LEXAN for transmitting the optical signals therethrough even though it does not have any lenses formed therein for focusing or collimating the optical signals like some of the other embodiments. Optical connection 80 for use with optical connection 600 may or may not include one or more lens as desired. FIG. 27 depicts a detailed view of the optical connection 600 mated to optical connection 80 and showing exemplary optical channels where the optical signals are turned at TIR surface 632 of optical connection 600. As shown, the optical signals have a first direction 638 going to and from TIR surface 632 and are turned to a second direction 639 from and to the TIR surface 632.

Figure 28:
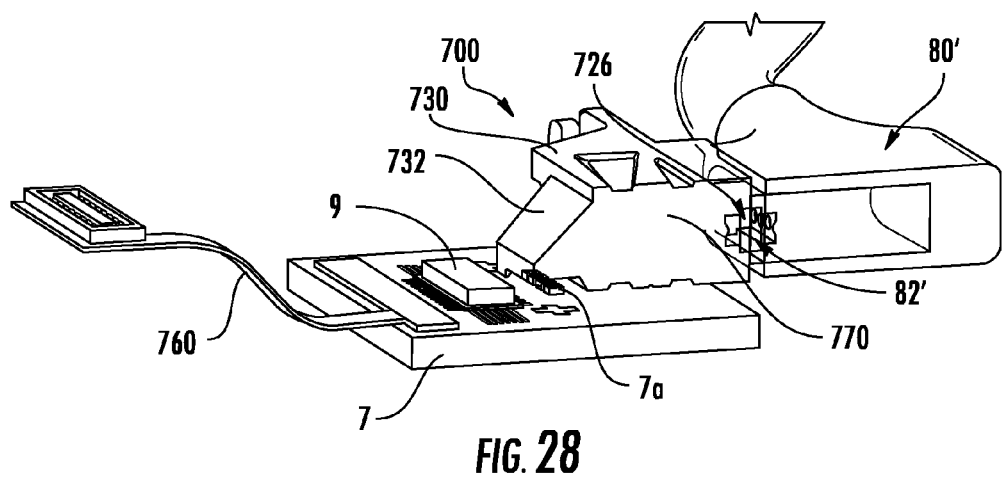
FIGS. 28-30 are various views of another optical connection uses a lenses at the optical interface between the plug and the receptacle according to the concepts disclosed.
Figure 29:
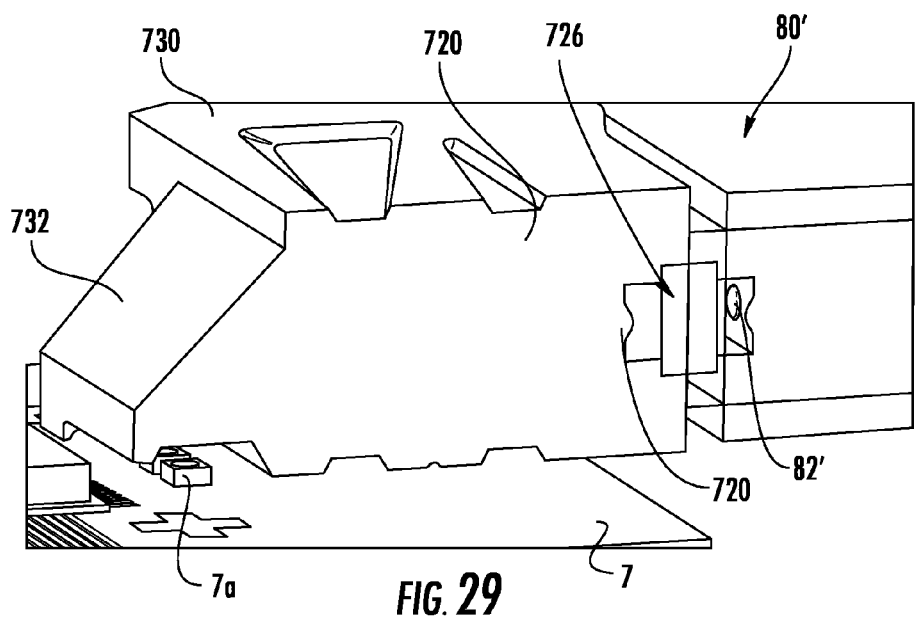
Figure 30:
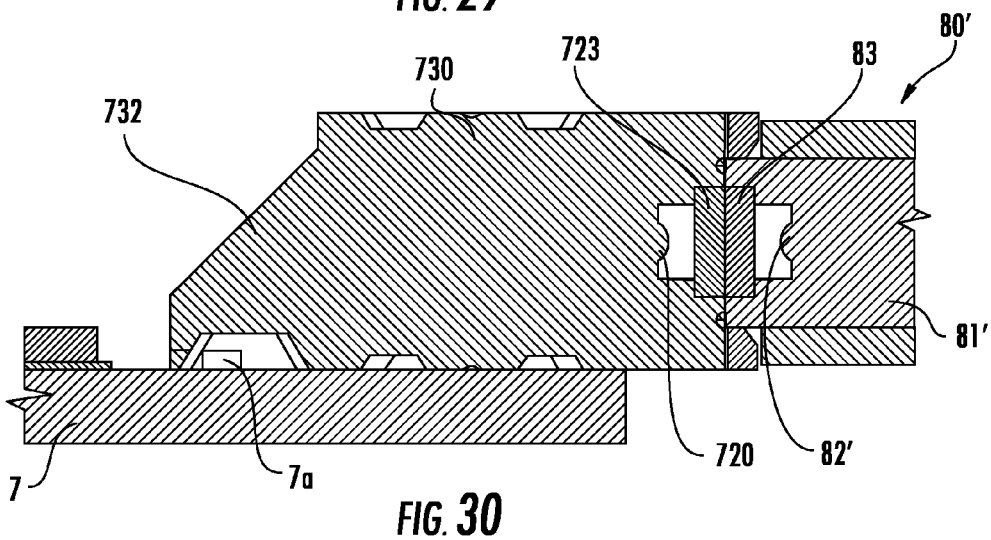

FIGS. 28-30 are various views of another optical connection 700 configured as a receptacle that is mated with optical connection 80' that is configured as a plug. Optical connection 700 includes an optical interface portion 726 having at least one optical channel. In this arrangement, each of the optical connections 700,80' include an optical interface portion having a cover refractive construction. In other words, the optical interface portions 726,82' of optical connections 700,80' both include lenses 720,82 that are integrally formed with the respective bodies of the optical connections 700,80' along with respective covers 723,83. Thus, the lenses that are integrally molded with the body are protected from environmental effects and allows cleaning of the cover without touching the lenses. As discussed, covers 723,83 may include one or more suitable coatings such as anti-reflection or anti-scratch as desired and are formed from any suitable material that allows transmission of optical signals such as glass or polymers. Further, body 730 is configured as a portion of a lens block in this embodiment and it also includes a total internal reflection (TIR) surface (not visible) for turning optical signal of at least one optical channel toward active components 7a disposed on a circuit board 7. As shown, the circuit board 7 may further include tethered electrical connection 760 for making an electrical connection with the electronic device. By way of example, the tethered electrical connection 760 may connect a signal conditioning integrated circuit (IC) 9 to another circuit board or device.

Figure 31:
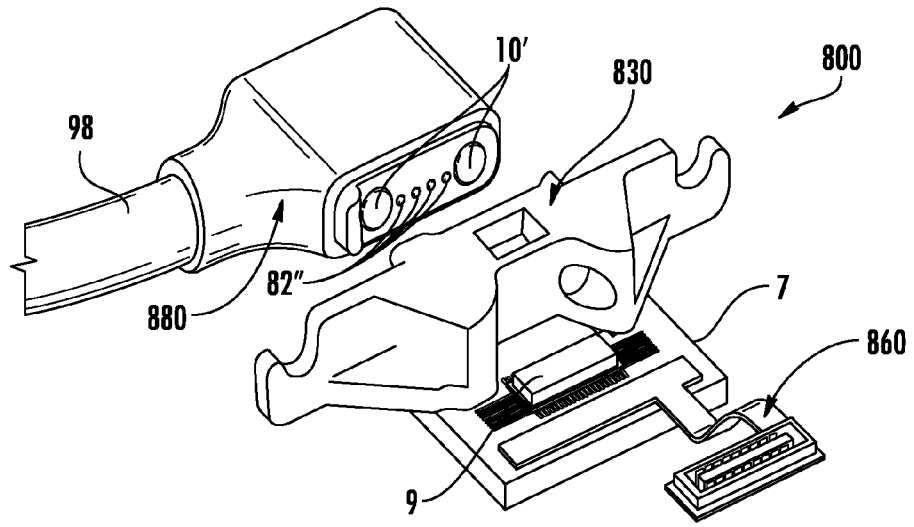
FIGS. 31-33 are various views of another optical connection configured as a plug that uses optical fibers at the optical interface along with an optical connection configured as a receptacle that uses lenses at the optical interface according to the concepts disclosed.
Figure 32:
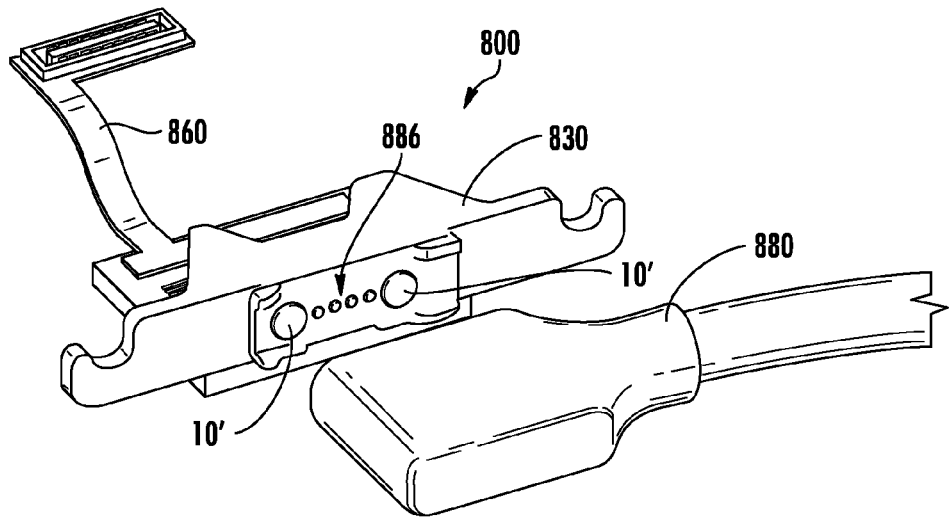
Figure 33:
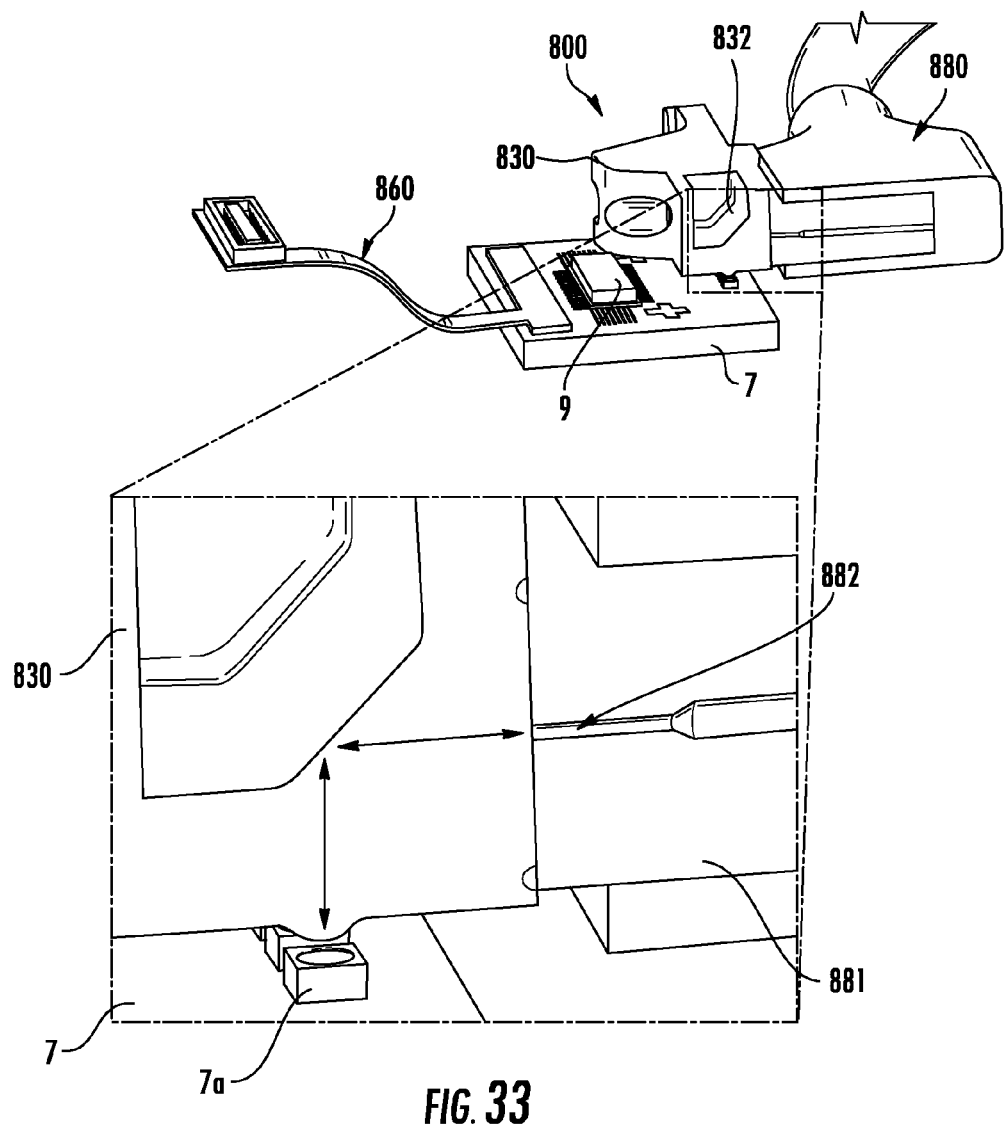

Still other variations of the concepts of the coupling portion as represented by bracket A (FIGS. 1-3) may be used on an optical connection configured as the plug and the optical connection with the magnet disposed within the alignment feature as represented by bracket B (FIGS. 1-3) may be disposed on the receptacle. By way of example, FIGS. 31-33 are various views of another optical connection 880 configured as a plug that uses optical fibers of the cable 98 at the optical interface 82" along with optical connection 800 configured as a receptacle that uses lenses at the optical interface according to the concepts disclosed.

FIG. 34 is a representative cross-sectional view of optical channels between an optical connection 980 configured as a plug and an optical connection 1000 configured as a receptacle arranged as a multi-row palindromic optical connection that may be used with the coupling portion concepts disclosed. Specifically, the optical channels 982,920 are configured as a 2×2 array having a palindromic layout. Optical connection 980 has an optical interface portion with four optical channels that each include a GRIN lens, but in other embodiments the optical channels 982 could include lenses that are integrally molded with a portion of the plug such as the body 981 (e.g., thereby forming a lens block) or have optical fibers at the mating interface. Optical connection 1000 has a body 930 with the optical interface portion having four optical channels 920 that includes two TIR surfaces 932 for turning the optical signals toward respective active components 7a that are electrically connected to circuit board 7.

Although the disclosure has been illustrated and described herein with reference to embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. An optical connection, comprising:
a body comprising:
a front surface;
an optical interface portion having at least one optical channel; and
a coupling portion comprising:
a piston disposed within a bore of the body, wherein the piston is movable between a first position and a second position,
a resilient member for biasing the piston to the first position, and
a magnet for retaining the piston at the second position,
wherein the first position provides a gap between the piston and the magnet such that the piston is generally flush with the front surface.

2. The optical connection of claim 1, further including a retainer attached to the body, wherein the magnet is secured to the retainer.

3. The optical connection of claim 1, wherein the resilient member is a coil spring.

4. The optical connection of claim 1, wherein the piston includes a cover portion and a ferrous material.

5. The optical connection of claim 4, wherein the cover portion is disposed about a front portion of the ferrous material.

6. The optical connection of claim 1, further including one or more electrical connections.

7. The optical connection of claim 1, further including a second coupling portion having a second piston that movable between a first position and a second position, a second resilient member for biasing the second piston to the first position and a second magnet for retaining the second piston at the second position, wherein the coupling portion and the second coupling portion are disposed on opposite sides of the optical interface portion.

8. The optical connection of claim 1, the optical connection being a portion of a receptacle or a plug.

9. The optical connection of claim 1, the optical interface portion being a portion of a lens block having a total internal reflection (TIR) surface for turning the optical signal of the at least one optical channel.

10. The optical connection of claim 1 being a portion of a receptacle with the optical interface portion being a portion of a lens block having a total internal reflection (TIR) surface for turning the optical signal of the at least one optical channel with the optical connection being in optical communication with one or more active components attached to a circuit board.

11. The optical connection of claim 1, the at least one optical channel having a GRIN lens or an integral lens.

12. The optical connection of claim 1, wherein the optical connection is a portion of an electronic device.

13. An optical connection, comprising:
an optical interface portion having at least one optical channel, the optical interface portion being a portion of a lens block, wherein the lens block has a total internal reflection (TIR) surface for turning the optical signal of the at least one optical channel, a first bore and a second bore, and the first bore and the second bore are disposed on opposite sides of the optical interface portion;
a retainer attached to the lens block;
a first coupling portion having a first piston that is movable between a first position and a second position, a first resilient member for biasing the piston to the first position and a first magnet for retaining the first piston at the second position, the first magnet being secured to the retainer, wherein the first position provides a first gap between the first piston and the first magnet, and the first piston being generally flush with a front surface of the optical connection in the first bore of the lens block at the first position; and
a second coupling portion having a second piston that is movable between a first position and a second position, a second resilient member for biasing the second piston to the first piston position and a second magnet for retaining the piston at the second position, the second magnet being secured to the retainer, wherein the first position provides a second gap between the second piston and the second magnet and the second piston is generally flush with the front surface of the optical connection in the second bore of lens block at the first position.

14. The optical connection of claim 13, wherein the first resilient member and the second resilient member are coil springs.

15. The optical connection of claim 13, wherein the piston includes a cover portion and a ferrous material.

16. The optical connection of claim 15, wherein the cover portion is disposed about a front portion of the ferrous material.

17. The optical connection of claim 13, further including one or more electrical connections.

18. The optical connection of claim 13, the optical connection being in optical communication with one or more active components attached to a circuit board.

19. The optical connection of claim 13, the at least one optical channel having a GRIN lens or an integral lens.

20. The optical connection of claim 13, wherein the optical connection is a portion of an electronic device.

21. The optical connection of claim 1, wherein the coupling portion is disposed adjacent to the optical interface portion.

22. The optical connection of claim 13, wherein the first coupling portion and the second coupling portion are disposed on opposite sides of the optical interface portion.

* * * * *